US009071330B2

(12) United States Patent
Frantz

(10) Patent No.: US 9,071,330 B2
(45) Date of Patent: Jun. 30, 2015

(54) PEER-TO-PEER COMMUNICATION INITIATED BY SHARED PHYSICAL EXPERIENCE

(75) Inventor: William T. Frantz, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 126 days.

(21) Appl. No.: 13/606,502

(22) Filed: Sep. 7, 2012

(65) Prior Publication Data

US 2014/0073245 A1    Mar. 13, 2014

(51) Int. Cl.
*H04B 7/00* (2006.01)
*H04B 7/26* (2006.01)
*H04L 29/08* (2006.01)
*H04W 76/02* (2009.01)

(52) U.S. Cl.
CPC ............... *H04B 7/26* (2013.01); *H04L 67/104* (2013.01); *H04W 76/023* (2013.01); *H04L 67/1068* (2013.01)

(58) Field of Classification Search
USPC ............... 455/418, 420, 41.1, 41.2, 500, 502, 455/517, 518, 519, 68, 69, 556.1, 556.2, 455/552.1, 553.1; 340/539.1, 539.11, 340/539.22, 539.23
See application file for complete search history.

(56) References Cited

U.S. PATENT DOCUMENTS

| | | | |
|---|---|---|---|
| 7,590,097 B2 * | 9/2009 | Ekberg et al. ............... 370/338 |
| 7,796,945 B2 * | 9/2010 | Abbate et al. ............... 455/41.2 |
| 8,391,792 B2 * | 3/2013 | Glezerman et al. .......... 455/41.2 |
| 8,446,364 B2 * | 5/2013 | Solomon ....................... 345/156 |
| 8,542,186 B2 * | 9/2013 | Alameh et al. ................ 345/156 |
| 2008/0268776 A1 * | 10/2008 | Amendola .................... 455/41.2 |
| 2010/0227556 A1 * | 9/2010 | Kim et al. ..................... 455/41.2 |
| 2013/0169550 A1 * | 7/2013 | Gai et al. ...................... 345/173 |

OTHER PUBLICATIONS

Bump Technologies, Inc., "Bump," Webpage found at http://bu.mp downloaded Feb. 15, 2013, 2 page(s), 2013, Published in U.S.
"Castelluccia, et al., "A Movement-based pairing protocol for CPU-constrained devices", Jan. 2005, p. 31, Published by: INRIA, Published in: France".
Holmquist, et al., "Smart-Its Friends: A Technique for Users to Easily Establish Connections between Smart Artefacts" 2001, pp. 116-122, Published by: UbiComp '01 Proceedings of the 3rd international conference on Ubiquitous Computing Published in: UK.

* cited by examiner

*Primary Examiner* — Tuan A Tran
(74) *Attorney, Agent, or Firm* — Neugeboren O'Dowd PC

(57) ABSTRACT

Apparatus and methods for pairing communication devices are disclosed. An exemplary apparatus includes at least one sensor to produce a data signal responsive to sensing physical characteristics of an environment of the communication device, and a capture component to capture portions of the data signal to generate local data indicative of the physical characteristics. A peer interface component receives, via the wireless transceiver, remote data from at least one other communication device that is indicative of physical characteristics of an environment of the other communication device. A data correlation component compares the local data with the remote data and initiates, when the comparison indicates the communication device and the other communication device are sensing the same physical characteristics, a pairing of the communication device with the other communication devices.

15 Claims, 8 Drawing Sheets

PEER-TO-PEER COMMUNICATION INITIATED BY SHARED PHYSICAL EXPERIENCE

FIELD OF THE INVENTION

The present invention relates to communication devices. In particular, but not by way of limitation, the present invention relates to communication devices that intercommunicate in peer-to-peer networks.

BACKGROUND OF THE INVENTION

Communication devices such as smartphones, netbooks, gaming devices, PDAs, desktop computers, and laptop computers are now ubiquitous. And the capabilities of these communication devices have developed to a level that enables these communication devices to intercommunicate in a wireless, peer-to-peer manner.

For example, peer-to-peer communication is now used in connection with a variety of applications including gaming (e.g., multi-player gaming), social networking (e.g., users may exchange messages), groupware applications (e.g., information may be synchronized and shared among ad-hoc groups without an external network), proximity based services (information may be broadcast to communication devices when within close proximity), and media entertainment applications (e.g., remote control and game control).

These interactive, wireless peer-to-peer applications and games suffer from a common problem when initiating the communication between devices—there is no easy way for users to initiate the connection. Unlike a wired connection, there is no physical act of connecting one device to another. Developers typically solve this problem by assigning arbitrary device names and/or session names, and users then select a name from a list of names. This is often a confusing and laborious step, which is prone to error.

For example, when a user joins a public, WiFi hotspot, the user goes to their WiFi settings, scans for access points, views a list of names (which are often nondescript and meaningless) and selects one of them. Similarly, when Bluetooth devices are paired, the user goes to Bluetooth settings, scans for devices, views a list of names (often meaningless) and selects one of them. And when a two-player game such as PacMan Kart is initiated, the user starts the game, scans for games currently in session, views a list of typically meaningless names and selects one of them. In each of these examples, another user arbitrarily decides the name of the hotspot, device, or game session. In a crowded environment, it's easy to encounter multiple names that are similar or even identical; thus is very difficult for a user to select the correct network to join.

As a consequence, the existing peer-to-peer initiation techniques are often less than desirable and will almost certainly be unsatisfactory in the future.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

Aspects of the invention may be characterized as a method for pairing communication devices. The method can include placing at least two communication devices in an environment where the at least two communication devices have a non-radio signal impinging upon them. The non-radio signal is detected at a first of the communication devices and local data is generated at the first communication device that is indicative of the non-radio signal. In addition, the first communication device receives remote data from a second of the communication devices indicative of the non-radio signal and compares the local data to the remote data. When the comparing indicates the non-radio signal received at the first and second communication devices is the same, the first and second communication devices are paired.

Another method may include prompting a user to place at least two communication devices next to each other and prompting the user to swipe across touch screens of the at least two communication devices. The swipe is sensed at a first of the communication devices and local data is generated at the first of the communication devices indicative of the swipe. In addition, the first communication device receives, via a transceiver, remote data from a second of the communication devices indicative of a detected swipe at the second of the communication devices. The at least two communication devices are paired when a comparison indicates the swipe at the first of the communication devices and the detected swipe at the second of the communication devices are portions of the same swipe.

Yet another method may include placing a first communication device in close proximity with at least one other communication device and generating a known signal with the first communication device that is detectable by the at least one other communication device. Local data characterizing the known signal is compared with remote data wirelessly received from the other communication device, and the first communication device is paired with the other communication device when the comparing indicates that the known signal generated by the first communication device is the signal detected by the other communication device.

Other aspects may be characterized as a communication device that can include at least one sensor to produce a data signal responsive to sensing physical characteristics of an environment of the communication device and a capture component to capture portions of the data signal to generate local data indicative of the physical characteristics. In addition, a wireless transceiver enables the communication device to send data to other communication devices and receive data from the other communication devices, and a peer interface component receives, via the wireless transceiver, remote data from at least one of the other communication devices that is indicative of physical characteristics of an environment of the at least one of the other communication devices. A data correlation component compares the local data with the remote data and initiates, when the comparison indicates the communication device and the other communication devices are sensing the same physical characteristics, a pairing of the communication device with the other communication devices.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

Figure 1:
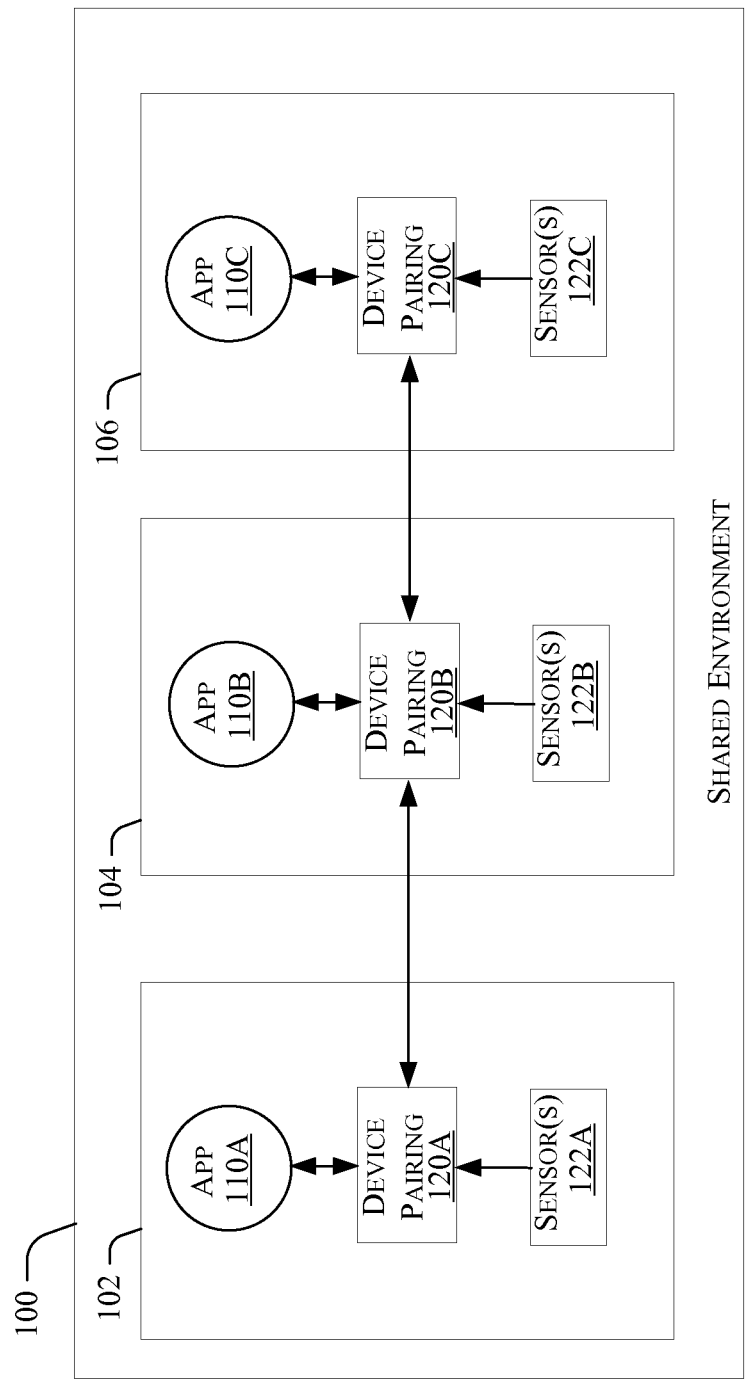
FIG. 1 is a block diagram depicting communication devices in an environment in which the communication devices share a physical experience.

Referring first to FIG. 1, it is a block diagram depicting a shared environment 100 in which several embodiments of the present invention may be realized. As shown, each of a first communication device 102, a second communication device 104, and a third communication device 106 are in communication with other ones of the communication devices 102, 104, 106. As depicted, each of the communication devices 102, 104, 106 includes a device pairing component 120A, 120B, 1120C that is coupled to a corresponding sensor 122A, 122B, 122C. The communication devices 102, 104, 106 may be realized by communication devices such as smartphones, netbooks, gaming devices, PDAs, and laptop computers.

The shared environment 100 is a region in space in which users of the communication devices 102, 104, 106 that want to collectively join a peer-to-peer session can place the communication devices 102, 104, 106 so that all of the communication devices 102, 104, 106 can join the peer-to-peer session by simply experiencing the same physical experience. In general, the communication devices 102, 104, 106 are in relative proximity to one another such that a physical phenomena affecting one of the communication devices 102, 104, 106 is detectable by the sensors 122A, 122B, 122C of all the communication devices 102, 104, 106. As a consequence, a collection of users that want to join in a peer-to-peer session may join in a session by simply having the communication devices 102, 104, 106 in close proximity to the exclusion of other communication devices that are outside of the shared environment 100.

Each of the depicted sensors 122A, 122B, 122C may be realized by one or more of a variety of sensor types to detect, as discussed further herein, a variety of corresponding detectable physical signals such as audible signals, optical signals, vibrational signals, and user motions (e.g., a finger swipe) at each of the communication devices 102, 104, 106. Thus, each of the depicted sensors 122A, 122B, 122C may be realized by one or more sensors including, without limitation, a microphone, a charged coupled device (CCD) image sensor, an accelerometer, and touchscreen. In operation, each sensor 122A, 122B, 122C generates local data that is indicative of the physical signals that impinges upon the sensor 122A, 122B, 122C. Beneficially, many types of communication devices already have one or more of these types of sensors; thus many embodiments described herein may be implemented in existing devices without the expensive addition of new sensor technologies.

As one of ordinary skill in the art will appreciate, each sensor 122A, 122B, 122C may transduce the physical signal that impinges upon the sensor 122A, 122B, 122C into analog signals that are amplified and converted (e.g., by an analog to digital converter) to a digital representation so that each of the communication devices 102, 104, 106 has a digital representation of the local data that is indicative of the shared physical signal.

The device pairing components 120A, 120B, 120C generally operate to compare the local data generated by the sensors 122A, 122B, 122C with remote data received from another communication device 102, 104, 106. For example, if both the first communication device 102 and the second communication device 104 experience the same physical signal, each of the sensors 122A, 122B generates data representative of the same physical signal. The device pairing component 120B at the second communication device 104 receives a digital representation of the physical signal generated by the sensor 122B and sends the digital representation to the device pairing component 120A of the first communication device 102.

From the perspective of the first communication device 102, the device pairing component 120A receives local data from the sensor 122A and compares the local data with the digital representation of the physical signal generated remotely at remote second communication device 104. If a comparison of the local data (generated locally by sensor 122A) and the remote data (generated remotely by sensor 122B) indicates the first communication device 102 and the second communication device 104 experienced the same physical signal, then the device pairing component 120A allows the first communication device 102 to be paired with the second communication device 104.

By virtue of the signals sensed at each of the communication devices 102, 104, 106, each of the devices can communicate with the other communication devices 102, 104, 106 so that each of the communication devices 102, 104, 106 can confirm, by a correlation of the data sensed at each of the communication devices 102, 104, 106, that the other communications devices 102, 104, 106 also shared the same physical experience; thus each of the communication devices 102, 104, 106 can trust the other communication devices 102, 104, 106 and can be paired in a secure peer-to-peer session.

In addition, for exemplary purposes, each of the communication devices 102, 104, 106 includes one or more applications 110A, 110B, 110C. The depicted applications 110A, 110B, 110C may be a variety of application types that are capable of operating within a peer-to-peer session including gaming applications, audio applications, video applications, social networking applications, groupware applications, proximity based services, and media entertainment. And although not separately depicted in FIG. 1, the applications 110A, 110B, 110C may operate as clients and/or services. For example, a chat application may alternate between sending messages (as a service) and receiving messages (as a client).

In addition to facilitating the initiation of a peer-to-peer session (e.g., by identifying a correlation between sensor data received at the communication devices 102, 104, 106), the depicted device pairing components 120A, 120B, 120C also interoperate to effectively extend a bus across the communication devices 102, 104, 106; thus creating a single logical bus, which enables any one of the applications 110A, 110B, 110C in the communication devices 102, 104, 106 to communicate with any of the other applications 110A, 110B, 110C. Although the device pairing components 120A, 120B, 120C, and several other embodiments described herein, may utilize bus daemons in the context of a software-bus type architecture, this is certainly not required, and the interactive communication schemes that are initiated by a shared physical experience may be utilized in connection with other peer-to-peer systems using different architectures.

In many implementations, the applications 110A, 110B, 110C and device pairing components 120A, 120B, 120C are capable of being deployed in connection with a variety of platforms. For example, but not by way of limitation, the applications 110A, 110B, 110C and device pairing components 120A, 120B, 120C may be deployed in connection with the Android platform, Ubuntu, Windows, Brew MP, WebOS, and Meego platforms.

The transport between the communication devices 102, 104, 106 may be any of a variety of technologies and protocols. For example, the communication devices 102, 104, 106 may communicate by Bluetooth, WiFi, or any other transport.

Figure 2:
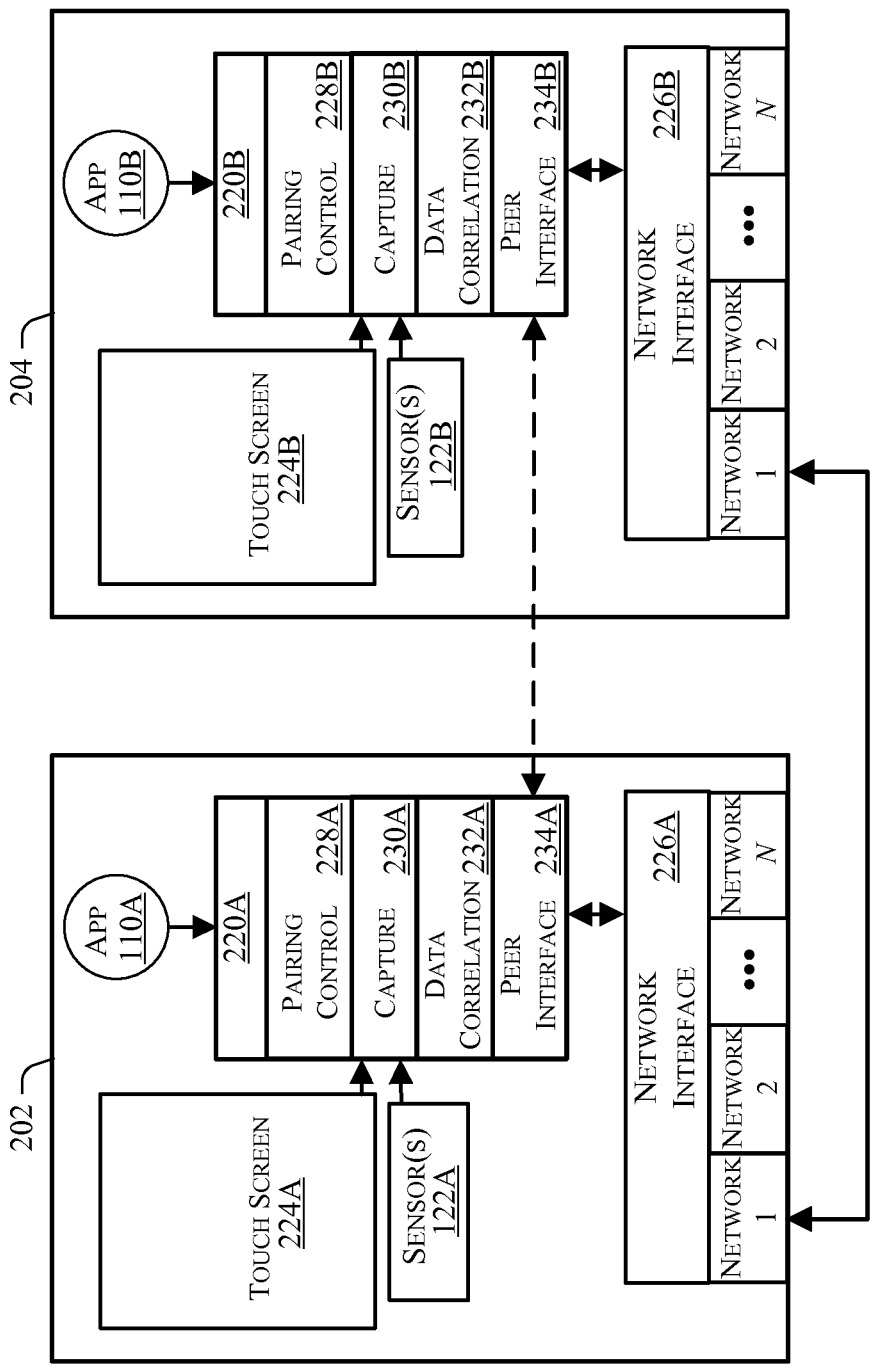
FIG. 2 is a block diagram depicting exemplary communication devices that may initiate peer-to-peer communication in response to a shared physical experience.

Referring next to FIG. 2, it is a block diagram depicting an exemplary first communication device 202 and an exemplary second communication device 204 that may initiate a mutual peer-to-peer session in response to a shared physical experience. As shown, each of the exemplary communication devices 202, 204 includes a device pairing component 220A, 220B, in communication with an app 110A, 110B, a touch screen 224A, 224B, one or more sensors 122A, 122B, and a network interface 226A, 226B. As shown, each of the device pairing components 220A, 220B includes a pairing control component 228A, 228B, a capture component 230A, 230B, a data correlation component 232A, 232B, and a peer interface component 234A, 234B. In addition, the network interface 226A, 226B in each communication device 202, 204 enables each communication device 202, 204 to communicate over N network types (e.g., via Bluetooth or WiFi).

It should be recognized that the depiction of the constituent components in each communication device 202, 204 is logical to describe functional capabilities of each communication device 202, 204. It is not intended to be an actual hardware diagram, and as discussed further herein, each component may be further separated into constituent components, but it should also be recognized that the components may be integrated to such an extent that each component may not be separately recognizable in actual implementation.

In general, each of the device pairing components 220A, 220B function to enable users to simply and securely pair the communication devices 202, 204 by exposing the communication devices 202, 204 to the same physical experience. And in addition, once a session is initiated between the communication devices 202, 204, the device pairing components 220A, 220B facilitate the ongoing communication between the apps 110A, 110B. But one of ordinary skill in the art will appreciate that the session initialization by shared physical experience function may certainly be implemented as a separate and discrete functional component apart from the peer-to-peer platform functionality that is also depicted as part of the device paring component 220A, 220B.

In general, the pairing control component 228A, 228B in each of the communication devices 202, 204 functions as an interface for the apps 110A, 110B to utilize the session initialization and peer-to-peer communication functionality of the device pairing component 220A, 220B. For example, the pairing control component 228A, 228B may provide a consistent and intuitive interface for developers of apps to utilize in connection with any app that may engage in a peer-to-peer session. In addition, the pairing control component 228A, 228B generally controls operations of the device pairing component 220A, 220B. For example, the pairing control component 228A, 228B coordinates the activities of the capture component 230A, 230B, the data correlation component 232A, 232B, and the peer interface 234A, 234B component to enable the general functionality of the device pairing component 220A, 220B.

As depicted, the capture component 230A, 230B generally operates to capture data representative of physical phenomenon that affects both of the communication devices 202, 204. For simplicity, components that underlie the touchscreen 224A, 224B and the sensors 122A, 122B, which are well known to those of skill in the art, such as sensing elements, amplifiers, analog to digital conversion components and digital processing components are not depicted. In many modes of operation, as described further herein, from the perspective of the first communication device 202, the capture component 230A captures data locally generated from the sensor 122A or touch screen 224A on the first communication device 202. And from the perspective of the second communication device 204, the capture component 230B captures sensor data that is locally generated from the sensor 122B or touch screen 224B on the second communication device.

The data correlation component 232A, 232B in each of the communication devices generally functions to compare local sensor data with remote sensor data that is generated from another communication device 202, 204. From the perspective of the first communication device 202 for example, the data correlation component 232A compares local data that is generated from one or more of the touch screen 224A and sensor 122A with remote data that is received from the second communication device 204. The remote data that is received from the second communication device 204 is generated from one or more of the touch screen 224B and sensor 122B, and from the perspective of the second communication device 204, is local data.

As discussed further herein, based upon the data correlation component 232A, 232B indicating the physical phenomenon experienced at both communication devices 202, 204 is the same, the device paring component 220A, 220B initiates pairing of the communication devices 202, 204 in a network session. Once the data correlation component 232A, 232B at each communication device 202, 204 has authenticated the other communication device 202, 204, the peer interface 234A, 234B provides the framework for the communication devices 202, 204 to communicate by peer-to-peer network. Although not required, the peer interface 234A, 234B on each device may be realized by bus-daemons that operate consistent with peer-to-peer technology that is marketed and distributed under the trade name ALLJOYN. Details of the ALLJOYN technology may be obtained at www.alljoyn.org, which provides several documents including the "Alljoyn Android Environment Setup Guide," among others, which are incorporated herein by reference.

As one of ordinary skill in the art will appreciate, the communication devices intercommunicate at the physical and transport layer via the network interface 226A, 226B, but the peer-to-peer interface 234A, 234B on each device create the appearance that the applications 110A, 110B communicate via a logical bus.

It should be recognized that although two communication devices 202, 204 are depicted merely for simplicity, multiple communication devices may include the same functional components and be paired in the same manner as the communication devices 202, 204 depicted in FIG. 2.

Figure 3:
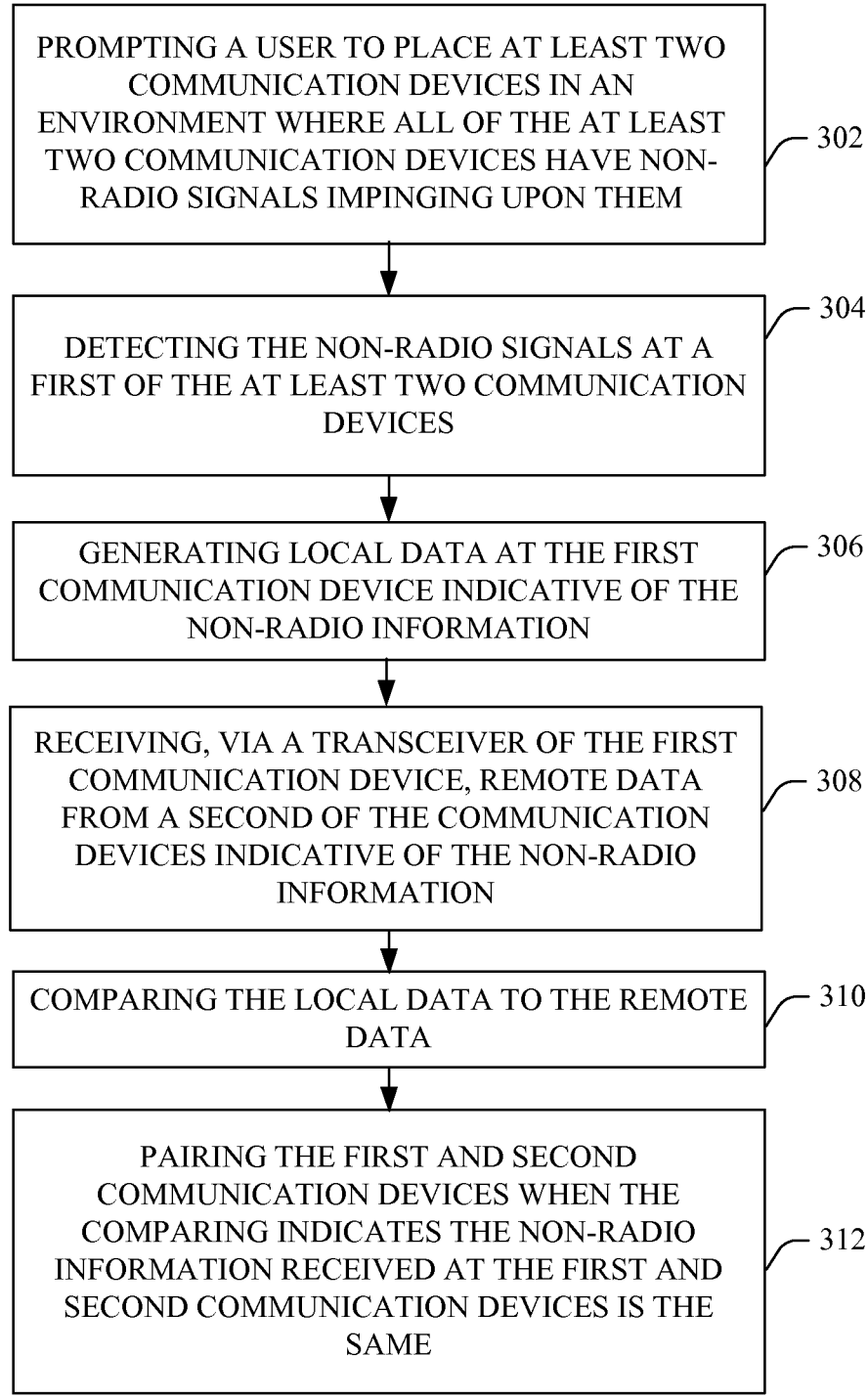
FIG. 3 is a flowchart depicting a method that may be traversed in connection with the embodiments depicted in FIGS. 1 and 2.

Referring next to FIG. 3, it is a flowchart depicting an exemplary method that may be traversed in connection with the embodiments depicted in FIGS. 1 and 2. As shown in this method, a user is prompted to place at least two communication devices in an environment where all of the communication devices have common non-radio signals impinging upon them (Block 302). The non-radio signals may include, for example, but not by way of limitation, audible signals, optical signals, and vibrational signals.

An audible signal may be a voice command or arbitrary sound made by one of the user's of the communication devices; a sequence of claps of a user; or an audio signal that is generated by one of the communication devices. An optical signal may be a quick response ("QR") code, a face of one of the users, or a light signal that may generated by one of the communication devices, or another light source such as an ordinary lamp that is switched on and off. Vibrational signals may include vibrations that are generated from a source from other than the communication devices, or as discussed further herein with reference to FIG. 6, one or more of the communication devices may generate the vibrations.

As shown, the non-radio signals are detected at a first of the at least two communication devices (e.g., communication device 202)(Block 304), and local data at the first communication device is generated that is indicative of the non-radio information (Block 306). For example, when detected by a sensor 122A or touch screen 224A of the first communication device 202, the sensor 122A or touch screen 224A converts the non-radio signal into an electrical analog representation of the non-radio signal that is amplified, sampled, and processed to characterize the local data in terms of a digital representation.

In addition, the first of the at least two communication devices receives, via transceiver of the first communication device, remote data from a second communication device (e.g., communication device 204) indicative of the non-radio signals (Block 308). For example, the second communication device also converts the non-radio signal into a digital representation of the signal to generate, from the perspective of the first communication device, remote data, which is transmitted to the first communication device.

As depicted, the first communication device compares the local data to the remote data (Block 310), and pairs the first and second communication devices when the comparing indicates the non-radio information received at the first and second communication devices is the same (Block 312).

Figure 4:
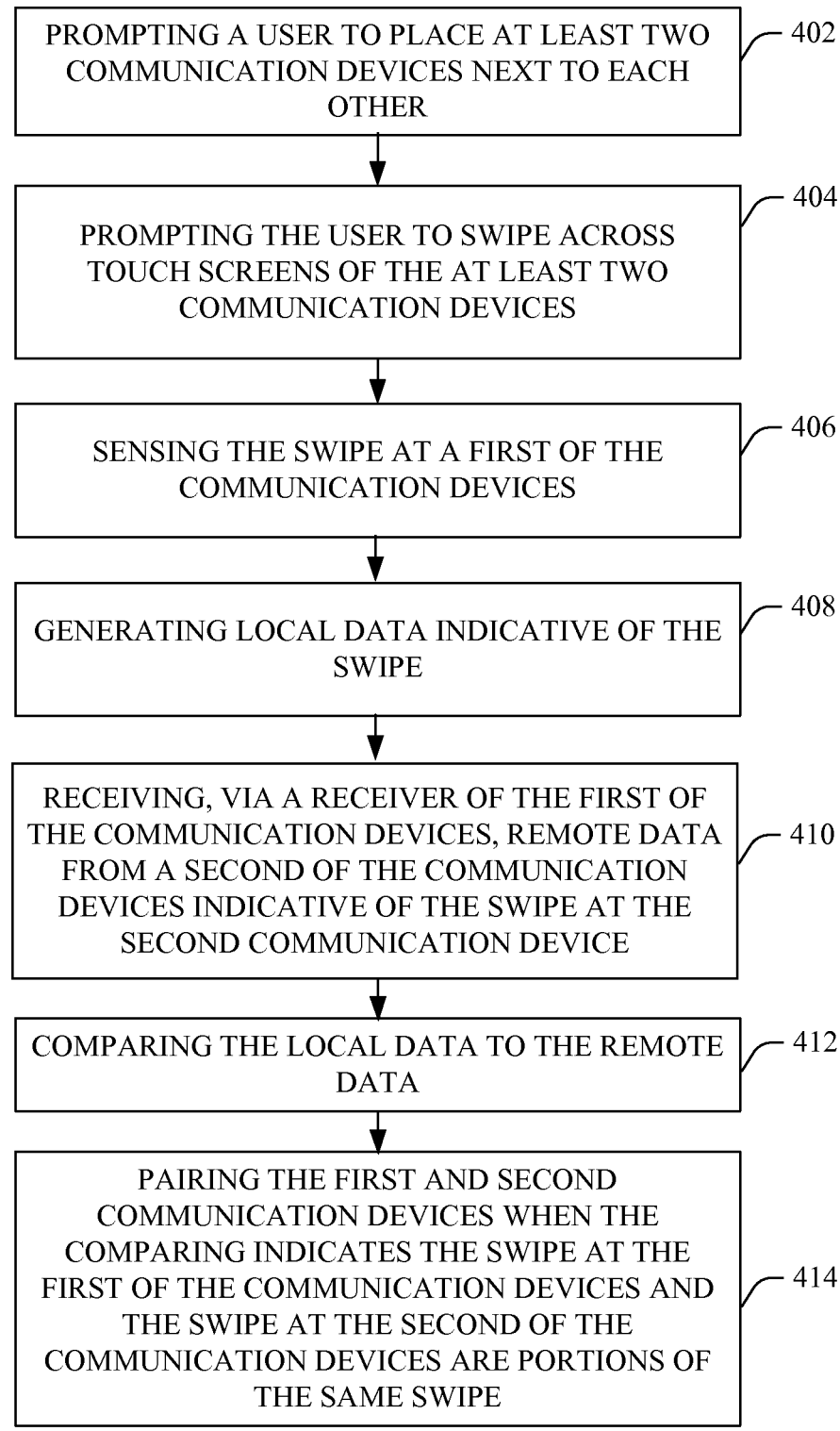
FIG. 4 is a flowchart that depicts another method that may be carried out in connection with the embodiments described with reference to FIGS. 1 and 2.

Referring to FIG. 4, it is a flowchart depicting another method that be carried out in connection with embodiments described herein. As shown, in this method a user is prompted to place at least two communication devices next to each other (Block 402). For example, the pairing control component 228A, 228B may provide a graphical or audible prompt to a user to place the communication devices next to each other when the user initiates a pairing of the communication devices.

Figure 5:
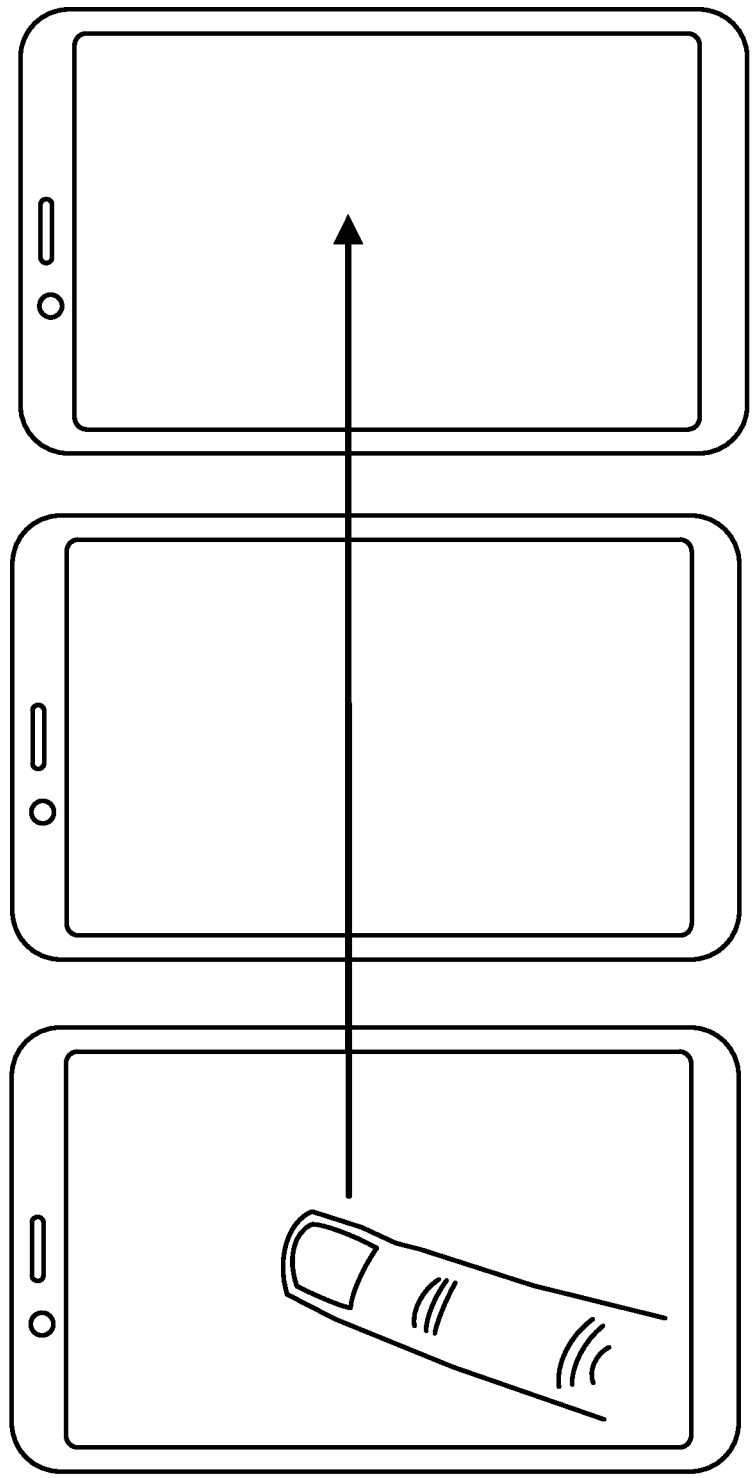
FIG. 5 is a diagram depicting a user swiping touch screens of communication devices to initiate pairing of the communication devices.

The user is then prompted to swipe a finger across the touchscreens (e.g., touchscreens 224A, 224B) of the communication devices (Block 404). Referring briefly to FIG. 5, shown are a first and second communication devices that are positioned next to each other while a user is swiping across the touchscreens of the first and second communication devices. Although the method depicted in FIG. 4 is described with reference to a first and second communication devices, this is merely for ease of explanation, and as shown in FIG. 5 placing more than three communication devices next to each other to experience the same shared swipe is certainly contemplated.

As shown in FIG. 4, the swipe is sensed at a first of the communication devices (Block 406), and the first of the communication devices generates local data indicative of the swipe (Block 408). For example, the local data may include a time range when the swipe initiated and ended. At the same time, a second of the communication devices may also generate data that characterizes the swipe, and then the second communication device may transmit its data (e.g., Bluetooth) that is indicative of the swipe to the first communication device.

As depicted in FIG. 4, a receiver of the first communication device (e.g., a Bluetooth receiver) receives the remote data from the second communication device (Block 410), and compares the local data generated at the first communication device with the remote data generated at the second communication device (Block 412). For example, the second communication device may send a report that identifies the second device (e.g., by a device identification number) along with information that characterizes the swipe as it was detected on the second communication device (e.g., a time range that identifies when the swipe started and when the swipe ended on the second communication device).

If the comparing indicates that the swipe at the first and second communication devices are portions of the same swipe, then the first and second communications devices are paired (Block 414). Thus, the first and second communication devices (e.g., the first communication device 202 and the second communication device 204) are paired as a result of the shared physical experience of the same swipe.

Figure 6:
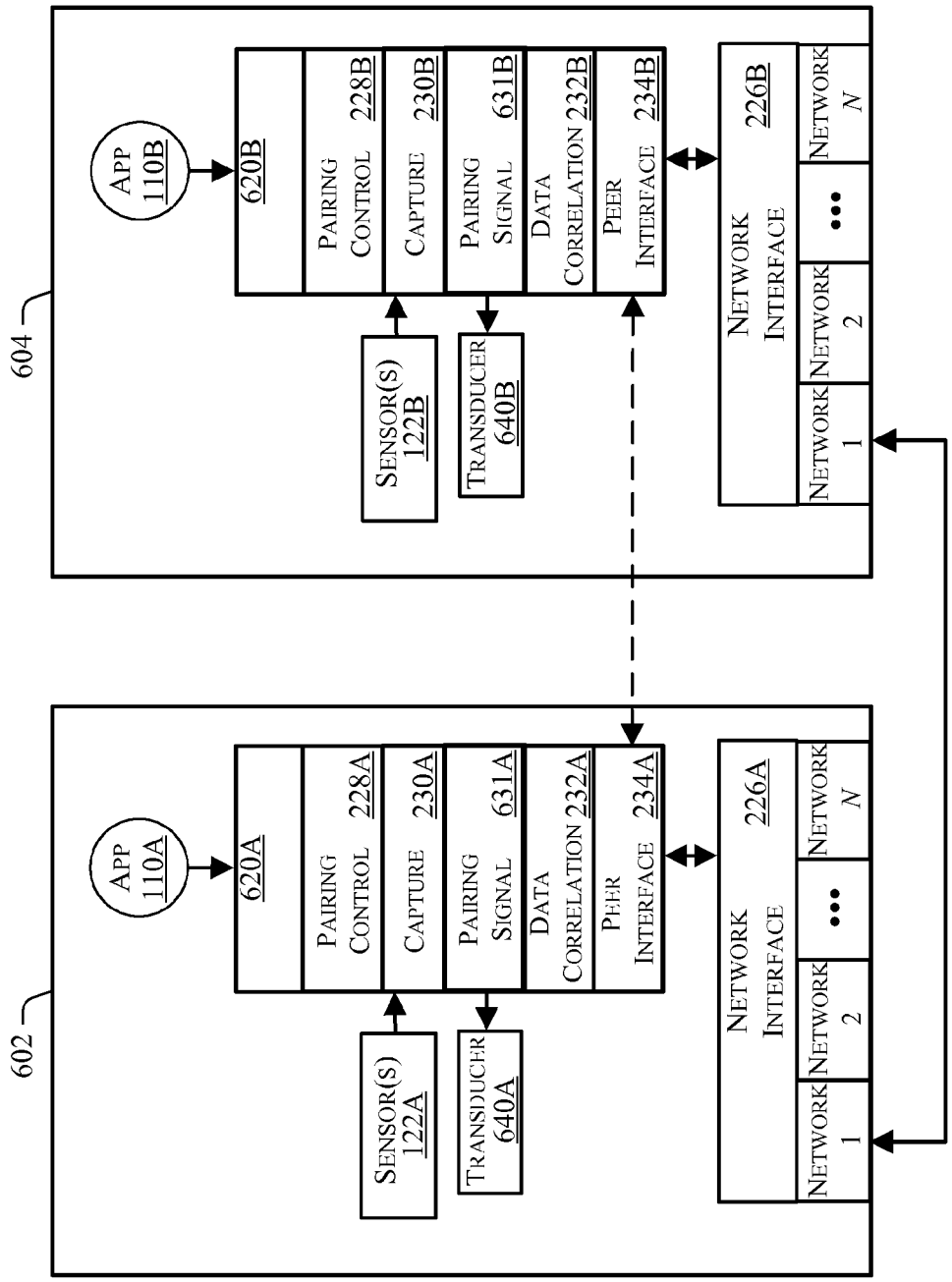
FIG. 6 is a block diagram depicting another embodiment of communication devices that generate a shared physical experience.

Referring next to FIG. 6, shown is another embodiment of communication devices 602, 604 that are capable of generating a shared physical experience. As shown, the communication devices 602, 604 in this embodiment include the same components as the communication devices 202, 204 described with reference to FIG. 2, but in this embodiment the device pairing components 620A, 620B includes a pairing signal component 631A, 631B, and the communication devices 602, 604 include and a transducer 640A, 640B.

In general, the pairing signal component 631A, 631B in this embodiment operates, in connection with the transducer 640A, 640B, to generate the signal of the shared physical phenomena that is experienced by the communication devices 602, 604. Although two communication devices 602, 604 are depicted in FIG. 6, as with the other embodiments described herein, the depiction of two communication devices 602, 604 is for simplicity and ease of description only—multiple communication devices may be realized and paired with the components depicted in the communication devices 602, 604.

Figure 7:
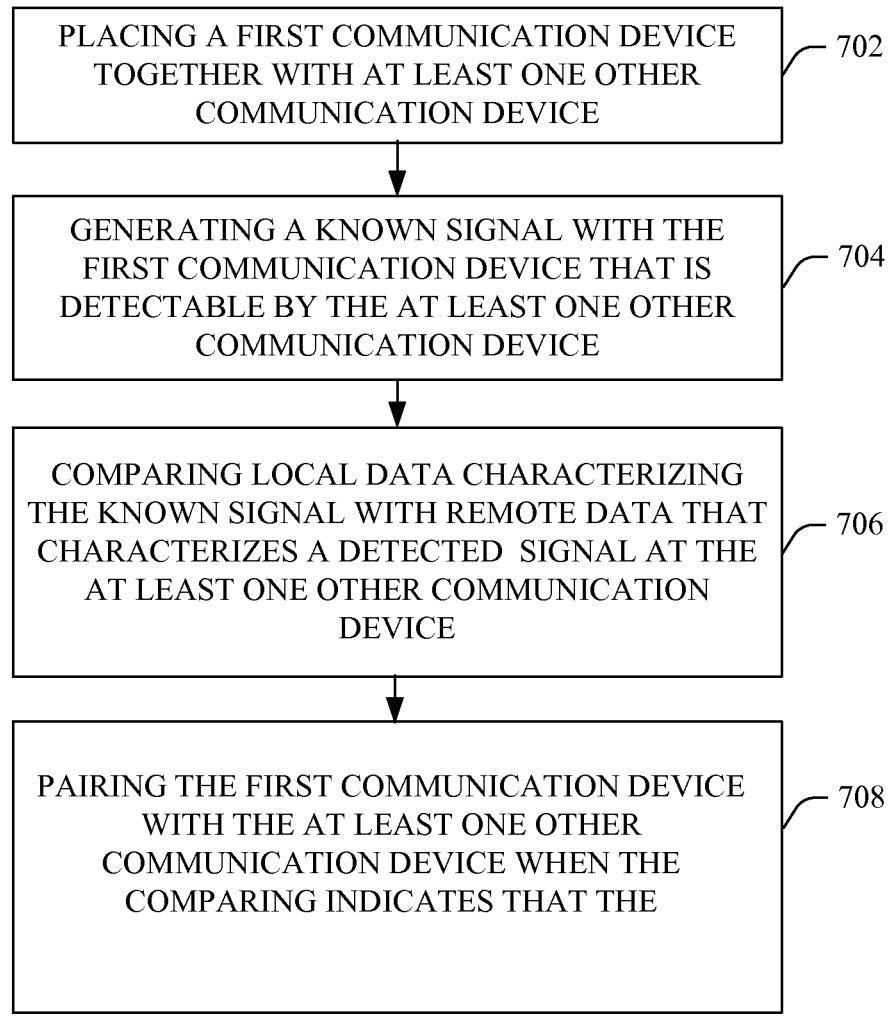
FIG. 7 is a flowchart that depicts a method that may be carried out in connection with embodiments described with reference to FIG. 6.

While referring to FIG. 6, simultaneous reference is made to FIG. 7, which is a flowchart that depicts a method that may be carried out in connection with embodiments described with reference to FIG. 6. As shown in FIG. 7, a first communication device (e.g., communication device 602) is placed together in close proximity to at least one other communication device (e.g., the second communication device 604) (Block 702). The first communication device then generates a known signal that is detectable by the at least one other communication device (Block 704).

For example, the pairing signal component 631A may include a collection of data stored in memory that defines a physical signal that is converted to an analog signal (e.g., by digital-to-analog and amplification components well known to those of ordinary skill in the art) and transduced by the transducer 640A into a physically detectable signal. The transducer 640A may be realized, for example, by an audio transducer, a vibration component, or an optical transducer to generate audible, vibrational, or optical signals, respectively, that are detectable by the at least one other communication device (e.g., the second communication device 604).

As shown, local data at the first communication device 602 characterizing the known signal is compared with remote data generated by the at least one other communication device 604 that characterizes the signal (Block 706), and the first communication device 602 is paired with the at least one other communication device 604 when the comparing indicates the signal detected at the at least one other communication device 604 is the signal generated by the first communication device 602 (Block 708).

In some implementations, the first communication device 602 may detect with its own sensor 122A the physical signal generated by its own transducer 640A, and then generate the local data based upon the data produced by its own sensor 122A. In other implementations, the first communication device 602 is able to compare the remote data received from one or more other communication devices (e.g., communication device 604) with data that is used to generate the known physical signal.

Although not required, in some embodiments, after detecting the known signal generated by the first communication device 602, the other communication device 604 may respond by generating its own physical signal that is generated by its own pairing signal component 631B and transducer 640B. The first communication device 602 may then transmit, via wireless connection, data indicative of the response signal to the second communication device 604, and the second communication device compares the data received from the first communication device 602 with its local data so that each of the communication devices 602, 604 may confirm that the other communication device received the physical signal it generated.

Figure 8:
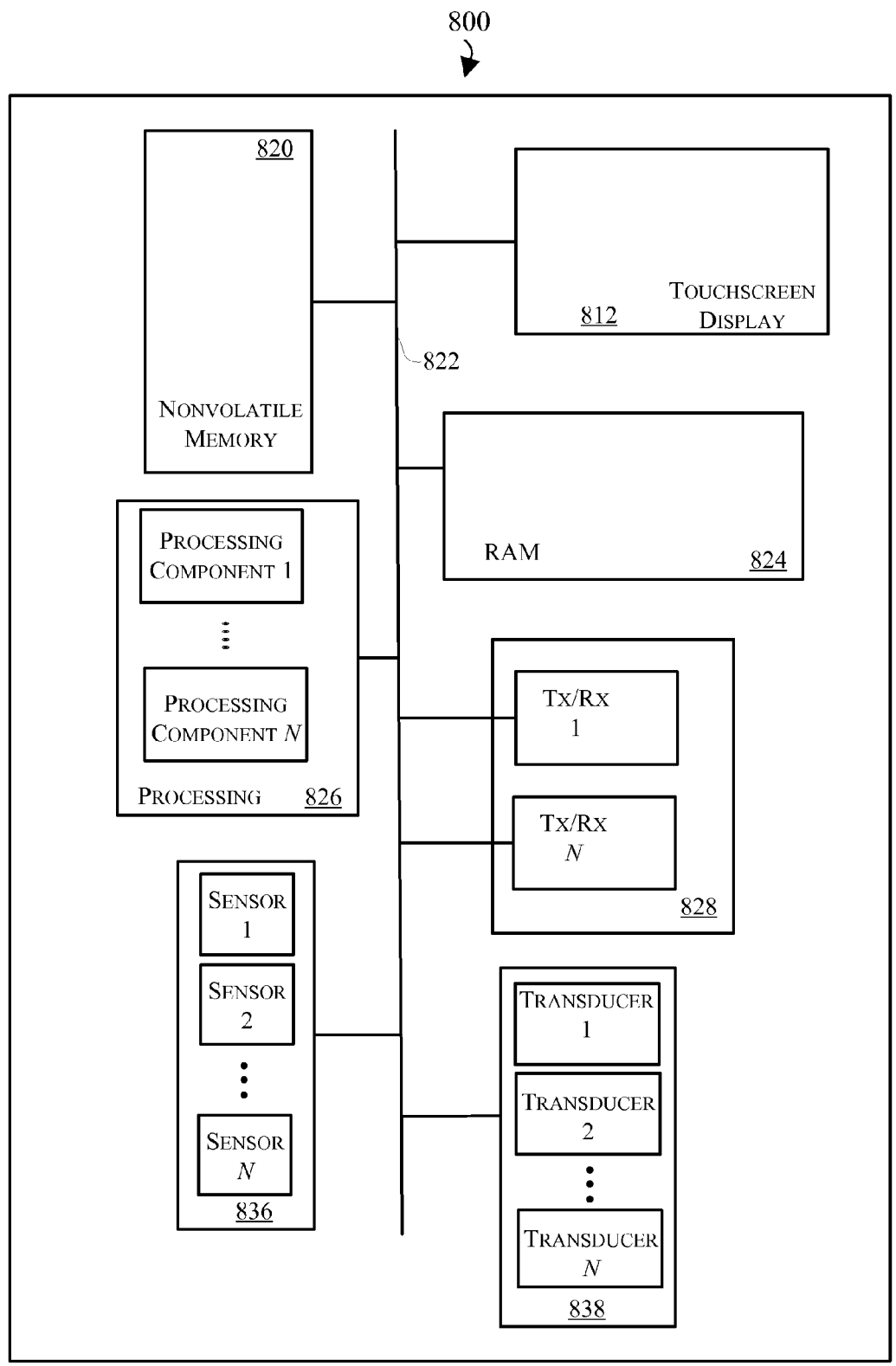
FIG. 8 is a block diagram depicting exemplary physical components of a communication device.

Referring next to FIG. 8, shown is a block diagram depicting physical components of an exemplary communication device 800 that may be utilized to realize the communication devices described with reference to FIGS. 1, 2, and 6.

As shown, the communication device 800 in this embodiment includes a display 812, and nonvolatile memory 820 that are coupled to a bus 822 that is also coupled to random access memory ("RAM") 824, a processing portion (which includes N processing components) 826, a transceiver component 828 that includes N transceivers, a sensor component 836 that includes N sensors, and a transducer component 838 that includes N transducers 838.

Although the components depicted in FIG. 8 represent physical components, FIG. 8 is not intended to be a hardware diagram; thus many of the components depicted in FIG. 8 may be realized by common constructs or distributed among additional physical components. Moreover, it is certainly contemplated that other existing and yet-to-be developed physical components and architectures may be utilized to implement the functional components described with reference to FIG. 8.

In operation the display 812 generally operates to provide a presentation of content to a user, and in several implementations, the display is realized by any of a variety of displays (e.g., LCD or OLED displays). But in addition, when realized as a touchscreen, the display 812 functions as a sensor to sense a shared physical experience (e.g., a user's finger swipe).

In general, the nonvolatile memory 820 functions to store (e.g., persistently store) data and executable code including code that is associated with the functional components depicted in FIGS. 1, 2, and 6. In some embodiments for example, the nonvolatile memory 820 includes bootloader code, modem software, operating system code, file system code, and executable code to facilitate the implementation of one or more portions of the device pairing components 120, 220 discussed in connection with FIGS. 1, 2, and 6 as well as other functional components depicted in FIGS. 1, 2, and 6.

In many implementations, the nonvolatile memory 820 is realized by flash memory (e.g., NAND or ONENAND™ memory), but it is certainly contemplated that other memory types may be utilized as well. Although it may be possible to execute the code from the nonvolatile memory 820, the executable code in the nonvolatile memory 820 is typically loaded into RAM 824 and executed by one or more of the N processing components in the processing portion 826.

The N processing components 826 in connection with RAM 824 generally operate to execute the instructions stored in nonvolatile memory 820 to effectuate the functional components depicted in FIGS. 1, 2, and 6. As one of ordinarily skill in the art will appreciate, the processing components 826 may include a video processor, modem processor, DSP, graphics processing unit (GPU), and other processing components.

The depicted transceiver component 828 includes N transceiver chains, which may be used for communicating with external devices via wireless networks. Each of the N transceiver chains may represent a transceiver associated with a particular communication scheme, and these may be utilized in connection with the network interface 226A, 226B to communicate with remote communication devices (e.g., via Bluetooth or WiFi).

The sensors in the sensor component 836 may include a microphone, accelerometer, charge coupled device ("CCD"), and one or more of these sensors may be used to realize the sensors 122A, 122B. The transducers in the transducer component 838 may include an audio speaker, a vibration generator, and a lamp (e.g., LED lamp), and one or more of the transducers are used to realize the transducers 640A, 640B described with reference to FIG. 6.

It should be recognized that FIG. 8 depicts just one exemplary implementation. Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for pairing communication devices, the method comprising:
   placing at least two communication devices in an environment where the at least two communication devices have the same simultaneous physical non-radio signal impinging upon them;
      wherein the signal comprises a shared sensory experience that is not predetermined by the devices,
   detecting the same simultaneous physical non-radio signal at a first of the at least two communication devices;
   generating local data at the first communication device indicative of the same simultaneous physical non-radio signal;
   receiving, via a receiver of the first communication device, remote data from a second of the communication devices indicative of the same simultaneous physical non-radio signal;
   correlating the local data to the remote data; and
   pairing the first and second communication devices when the correlating indicates the same simultaneous physical non-radio signal received at the first and second communication devices can be trusted to form a secure peer-to-peer session.

2. The method of claim 1, wherein the same simultaneous physical non-radio signal is selected from among sounds, optical information, and vibrations.

3. The method of claim 1, including:
   prompting a user of one of the at least two communication devices to produce a sound.

4. The method of claim 1, wherein detecting includes capturing an image of an object.

5. A method for pairing communication devices, the method comprising:
   placing a first communication device in physical contact with at least one other communication device;
   generating a vibration with a vibration motor of the first communication device that is transmitted through the physical contact to the at least one other communication device;
   comparing local data characterizing the vibration with remote data wirelessly received from the at least one other of the communication device, the remote data identifying the at least one other communication device and characterizing a detected signal at the at least one other communication device; and
   pairing the first communication device with the at least one other communication device when the comparing indicates that the vibration generated by the first communication device is the signal detected by the at least one other communication device.

6. A communication device comprising:
   at least one sensor to produce a data signal responsive to sensing physical non-radio characteristics of an ambient environment of the communication device;
      wherein the physical non-radio characteristics are not-predetermined by the communication device,
   a capture component to capture portions of the data signal to generate local data indicative of the physical characteristics;
   a wireless transceiver that enables the communication device to send data to other communication devices and receive data from the other communication devices;
   a peer interface component to receive, via the wireless transceiver, remote data from at least one of the other communication devices, the remote data is indicative of physical non-radio characteristics of an ambient environment of the at least one of the other communication devices;
   a data correlation component to compare the local data with the remote data and initiate, when the comparison indicates the communication device and the at least one of the other communication devices are sensing the same physical non-radio characteristics and can be trusted to form a secure peer-to-peer session, a pairing of the communication device with the at least one of the other communication devices.

7. The communication device of claim 6, wherein the physical non-radio characteristics are one of audible sound, optical characteristics, and vibrational characteristics.

8. A communication device comprising:
   means for placing at least two communication devices in an environment where the at least two communication devices have the same simultaneous physical non-radio signal impinging upon them;
      wherein the signal comprises a shared sensory experience that is not predetermined by the devices,
   means for detecting the same simultaneous physical non-radio signal at a first of the at least two communication devices;
   means for generating local data at the first communication device indicative of the same simultaneous physical non-radio signal;
   means for receiving, via a receiver of the first communication device, remote data from a second of the communication devices indicative of the same simultaneous physical non-radio signal;
   means for correlating the local data to the remote data; and
   means for pairing the first and second communication devices when the correlating indicates the same simultaneous physical non-radio signal received at the first and second communication devices can be trusted to form a secure peer-to-peer session.

9. The communication device of claim 8, wherein the same simultaneous physical non-radio signal is selected from among sounds, optical information, and vibrations.

10. The communication device of claim 8, including:
   means for prompting a user of one of the at least two communication devices to produce a sound.

11. The communication device of claim 8, wherein the means for detecting include means for capturing an image of an object.

12. A non-transitory, tangible computer readable storage medium, encoded with processor readable instructions to perform a method for pairing communication devices, the method comprising:
   placing at least two communication devices in an environment where the at least two communication devices have a same simultaneous physical non-radio signal impinging upon them;
      wherein the signal comprises a shared sensory experience that is not predetermined by the devices,
   detecting the same simultaneous physical non-radio signal at a first of the at least two communication devices;
   generating local data at the first communication device indicative of the same simultaneous physical non-radio signal;
   receiving, via a receiver of the first communication device, remote data from a second of the communication devices indicative of the same simultaneous physical non-radio signal;
   correlating the local data to the remote data; and
   pairing the first and second communication devices when the correlating indicates the same simultaneous physical non-radio signal received at the first and second communication devices can be trusted to form a secure peer-to-peer session.

13. The non-transitory, tangible computer readable storage medium of claim 12, wherein the same simultaneous physical non-radio signal is selected from among sounds, optical information, and vibrations.

14. The non-transitory, tangible computer readable storage medium of claim 12, wherein the method includes:
   prompting a user of one of the at least two communication devices to produce a sound.

15. The non-transitory, tangible computer readable storage medium of claim 12, wherein detecting includes capturing an image of an object.

* * * * *